(No Model.) 2 Sheets—Sheet 1.

R. J. GARDNER.
Drag Sawing Machines

No. 230,766. Patented Aug. 3, 1880.

WITNESSES:
Jas. E. Hutchinson.
J. A. Rutherford

INVENTOR:
R. J. Gardner;
by James L. Norris.
Att'y.

(No Model.) 2 Sheets—Sheet 2.

R. J. GARDNER.
Drag Sawing Machines.

No. 230,766. Patented Aug. 3, 1880.

WITNESSES:
Jas. E. Hutchinson.
J. A. Rutherford

INVENTOR:
R. J. Gardner,
by James L. Norris.
Att'y.

UNITED STATES PATENT OFFICE.

ROBERT J. GARDNER, OF ROCKDALE, TEXAS, ASSIGNOR OF ONE-THIRD OF HIS RIGHT TO W. L. LUTNER AND JOSEPH HOOK, OF SAME PLACE.

DRAG-SAWING MACHINE.

SPECIFICATION forming part of Letters Patent No. 230,766, dated August 3, 1880.

Application filed March 12, 1880. (No model.)

*To all whom it may concern:*

Be it known that I, ROBERT J. GARDNER, a citizen of the United States, residing at Rockdale, in the county of Marlin, State of Texas, have invented new and useful Improvements in Drag-Sawing Machines, of which the following is a specification.

This invention relates to an improvement in sawing-machines adapted for using both circular and reciprocating saws, and especially designed for general sawing in cabinet-makers' and carpenters' shops, its object being to provide for the proper guiding and support of the reciprocating saw and for the ready adjustment and firm maintenance of the articles to be sawed in proper position for the action of said saw.

Figure 1:
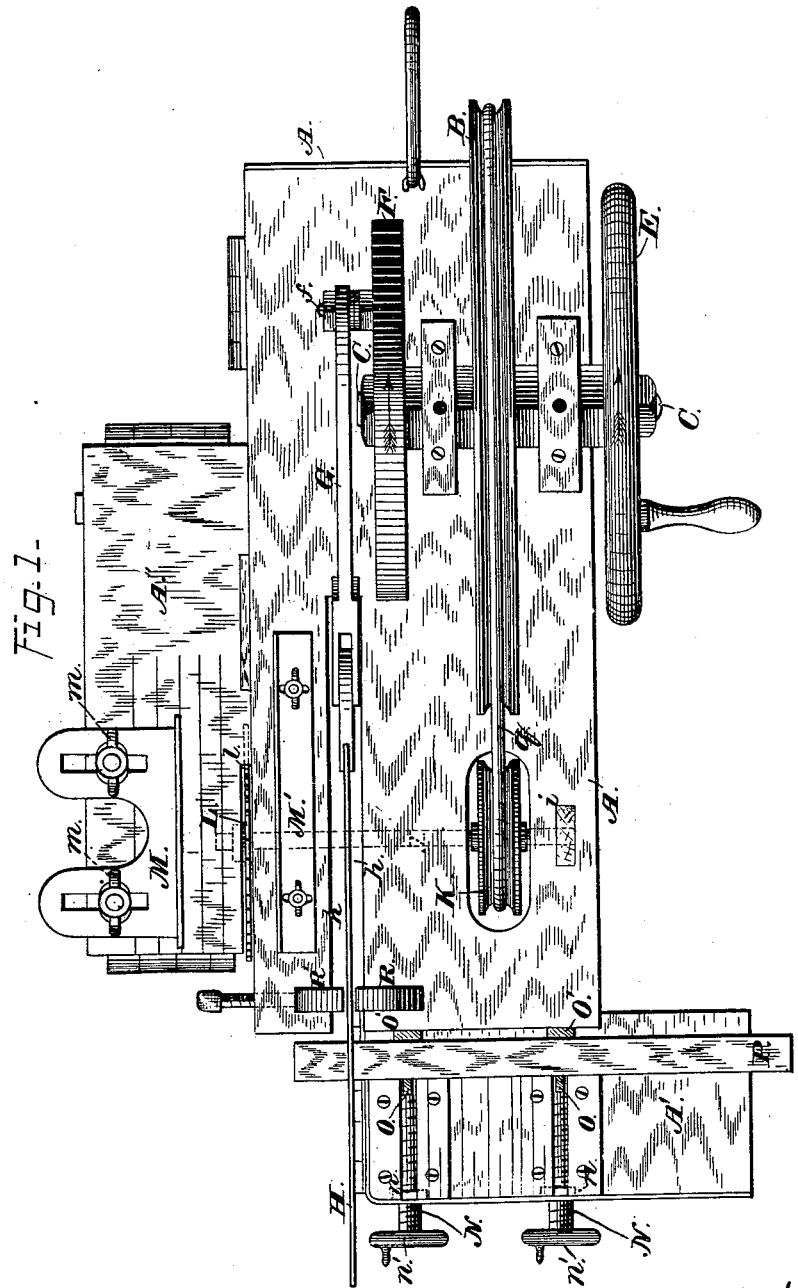
Figure 2:
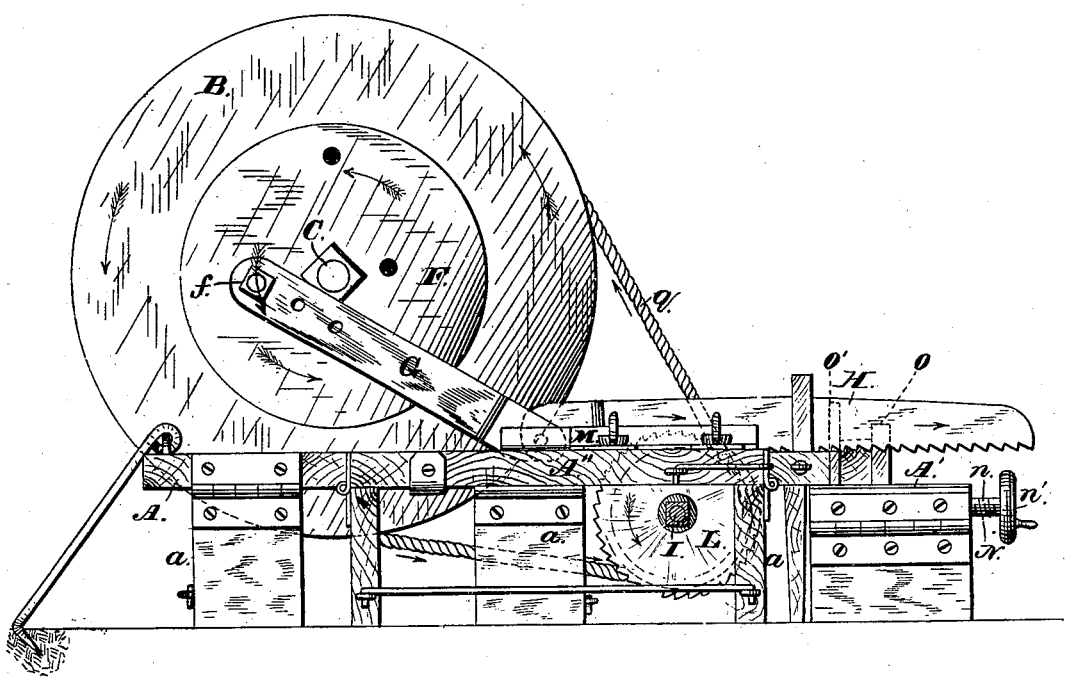
Figure 3:
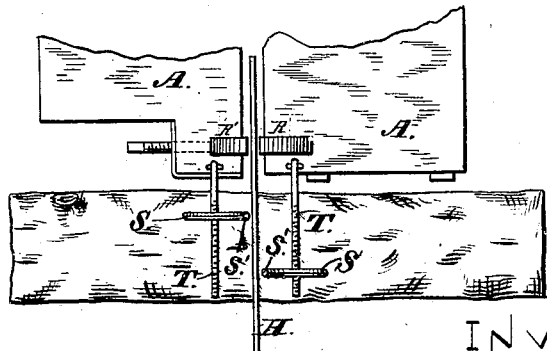

In the accompanying drawings, Figure 1 is a plan view of my improved sawing-machine. Fig. 2 is a side elevation of the same. Fig. 3 is a detail view, illustrating the devices for dogging or holding the work for the reciprocating saw. Fig. 4 is a detached view of one of the dogs.

The letter A indicates the bench or table supporting the various working parts of the machine and itself supported by legs $a$. Near one end of this table a belt-wheel, B, is mounted on a shaft, C, journaled in bearings supported by upwardly-projecting standards, the edge of said wheel extending through a slot in the table, and on the projecting ends of this shaft respectively are mounted a fly-wheel, E, which hangs beyond the edge of the table, and a wheel, F, located over about the longitudinal center of the table, and provided with a wrist-pin, $f$, to which is connected a pitman, G, the opposite end of which is pivoted to a reciprocating saw, H, which plays in and beyond a longitudinal slot, $h$, and athwart the end of an extension, A', of the table, the top of said extension being somewhat lower than the top of the main table, and provided with work-clamps, which will be hereinafter described.

Near the end of the table A, opposite the belt-wheel B, a shaft, I, is mounted transversely under the table in bearings supported by or formed in hangers $i$, secured to the lower surface of the table. Upon this shaft I is fixed a belt-pulley, K, projecting through a slot in the table. In the present instance, but not necessarily, said pulley is connected by a belt, $q$, with the belt-wheel $g$.

Upon or near the end of the shaft I, which projects beyond the side of the main table A, a circular saw, L, is fixed, and plays through a slot or recess, $l$, formed in the edge of the top of a side extension, A'', of the main table A. Upon the top of this extension A'' is arranged guide-gage M, adjustable laterally in the ordinary manner by means of slots and screws and nuts $m$, and upon the main table is arranged a similar guide-gage, M'. The timbers or boards to be sawed by the circular saw L are fed in the direction of the arrow between the gages M and M', and the relative positions of these gages determine the line of cut.

One of the gages may be used alone, of course, in the ordinary manner.

In the top of the said extension A' of the main table are formed slots or recesses, in which play screw-rods N, passing through fixed nuts $n$ at the edge of said extension, and provided with suitable hand-wheels $n'$. To the plain inner tips of these screw-rods are jointed the lower ends of arms O, which project through the slots or grooves and above the top of the extension, and from the end edge of the main table A arms O' project upward, standing in line with the arms O.

The timbers or boards, as at P, to be sawed by the reciprocating saw are laid upon the extension A'', with their ends or portions to be sawed off projecting under the saw the proper distance.

The arms O' are arranged to hold the timbers at an exact right angle to the path of the saw in order that a true and square cut may be made; but by arranging suitably-formed oblique blocks between the arms O' and the timber of course said timbers may be sawed obliquely, as in the case of rafters.

Near the open end of the slot $h$, in which the reciprocating saw plays, and on each side of the said slot, are arranged standards R R', the inner edges of which are straight and project toward the longitudinal center of the slot, these straight edges serving as guides for the saw G, which plays between them, and the upper edge only of which they embrace, leaving the lower edge free in order that the teeth may not be interfered with and may be set laterally to any extent desired. The standard R' is adjustable by means of a screw, r, passing through the top of the table, in order to provide for various thicknesses of saws.

It will be understood that the reciprocating and circular saws are not ordinarily to be used at the same time. When the circular saw is to be used alone the pitman G is detached from the wrist-pin of wheel F and the reciprocating saw removed, and when the reciprocating saw is to be used alone the belt q is simply thrown off the left wheel.

When heavy timbers are to be sawed by the reciprocating saw the screws and arms O may be removed from the extension A'', and dogs S, as shown in Fig. 4, arranged upon screw-rods T, as shown in Fig. 3, jointed to the end of table A, may be used, the upward-turned ends S' of the dogs being turned toward the saw and serving to guide the same.

I am aware that sawing-machines have been constructed having rotary and reciprocating saws for alternate operation, and that such machines have been provided with screw-clamps for holding the work in position for the action of the reciprocating saws, and I lay no claim to such machines, broadly, nor to such clamps.

I am also aware that a reciprocating sawing-machine has been provided with friction-rollers, between which its saw plays and is guided; but such rollers embrace the entire width of the saw, and therefore interfere with the saw-teeth, or to avoid contact with said teeth must be placed so far apart as to preclude their service for accurately guiding the saw, while my improved guides may embrace the upper portion of the saw-blade as closely as desired and do not interfere with the teeth.

I do not claim, broadly, guides between which a reciprocating saw plays; but,

Having now described my invention, I claim—

1. The combination, with the table A, provided with the slot h, and the reciprocating saw playing in said slot, of the straight-edged arms R R', embracing the upper edge only of the said saw, one of said arms being adjustable, substantially as and for the purpose set forth.

2. The combination, with the main table A and the extension A' for the support of the work, of the screw-rods T, loosely attached to the main table, and the dogs S, arranged upon said screw-rods and provided with the upward-projecting ends S', substantially as and for the purpose set forth.

In testimony whereof I have hereunto set my hand in the presence of two subscribing witnesses.

R. J. GARDNER.

Witnesses:
 JAMES L. NORRIS,
 ALBERT H. NORRIS.